US011983776B2

(12) United States Patent
Cook

(10) Patent No.: US 11,983,776 B2
(45) Date of Patent: *May 14, 2024

(54) VEHICLE REPAIR COST ESTIMATE ACQUISITION SYSTEM AND METHOD

(71) Applicant: Ingrid L. Cook, Pittsburgh, PA (US)

(72) Inventor: Ingrid L. Cook, Pittsburgh, PA (US)

( * ) Notice: Subject to any disclaimer, the term of this patent is extended or adjusted under 35 U.S.C. 154(b) by 488 days.

This patent is subject to a terminal disclaimer.

(21) Appl. No.: 17/197,778

(22) Filed: Mar. 10, 2021

(65) Prior Publication Data

US 2021/0192638 A1    Jun. 24, 2021

Related U.S. Application Data

(63) Continuation of application No. 15/658,930, filed on Jul. 25, 2017, now Pat. No. 10,991,051, which is a continuation of application No. 13/164,714, filed on Jun. 20, 2011, now Pat. No. 9,721,301.

(60) Provisional application No. 61/356,592, filed on Jun. 19, 2010.

(51) Int. Cl.
*G06Q 40/08* (2012.01)
*G06Q 10/04* (2023.01)
*G06Q 30/0283* (2023.01)

(52) U.S. Cl.
CPC ............ *G06Q 40/08* (2013.01); *G06Q 10/04* (2013.01); *G06Q 30/0283* (2013.01)

(58) Field of Classification Search
CPC ..... G06Q 40/08; G06Q 10/04; G06Q 30/0283
See application file for complete search history.

(56) References Cited

U.S. PATENT DOCUMENTS

| 7,636,676 | B1* | 12/2009 | Wolery | G06Q 30/0611 |
| | | | | 705/26.4 |
| 9,721,301 | B2* | 8/2017 | Cook | G06Q 10/04 |
| 10,991,051 | B2* | 4/2021 | Cook | G06Q 40/08 |
| 2002/0055861 | A1* | 5/2002 | King | G06Q 40/08 |
| | | | | 705/4 |
| 2002/0193925 | A1* | 12/2002 | Funkhouser | G07C 5/0808 |
| | | | | 701/31.8 |

(Continued)

OTHER PUBLICATIONS

Anonymous, "The Hertz Corporation Adopts OEConnection Technology to Speed Vehicle Repair Process:—Collisionlink(R) Helps Cut Costs By Returning Damaged Vehicles To Operation Faster—," PR Newswire, New York, PR Newswire Association LLC, Sep. 9, 2008.*

*Primary Examiner* — Nathan Erb

(57) ABSTRACT

A computer-based method for obtaining repair estimates for a vehicle, and a related network server, are provided. The method comprises receiving a vehicle identification number (VIN) over a network from a customer computer, retrieving vehicle information, associated with the VIN, from a database, sending the vehicle information and a graphical representation of the vehicle, including a plurality of selectable vehicle damage locations, over the network to the customer computer, receiving a selection of at least one vehicle damage location over the network from the customer computer, receiving at least one image of the vehicle over the network from the customer computer, storing the vehicle information, the selected damage location and the vehicle image as a repair job in a non-volatile memory or the database, and sending a notification, indicating that the new repair job is available for review, over the network to at least one repair provider computer.

16 Claims, 10 Drawing Sheets

(56) References Cited

U.S. PATENT DOCUMENTS

| | | | | |
|---|---|---|---|---|
| 2005/0102394 A1* | 5/2005 | Loveland | ......... | G06Q 10/06311 |
| | | | | 709/224 |
| 2006/0242089 A1* | 10/2006 | Vahidi | ................ | G06Q 30/0206 |
| | | | | 705/400 |
| 2006/0287954 A1* | 12/2006 | DeWitt | ................ | G06Q 20/105 |
| | | | | 705/40 |
| 2009/0240531 A1* | 9/2009 | Hilborn | ................. | G06Q 10/10 |
| | | | | 705/4 |

* cited by examiner

Send Bid

Bid Amount * — 1010

$ [    ] .00

Estimated Time to Complete *

[    ] days

— 1020

Questions/Comments — 1030

[                    ]

* = Required Fields
— 1040
Send

FIG. 10

VEHICLE REPAIR COST ESTIMATE ACQUISITION SYSTEM AND METHOD

CROSS-REFERENCE TO RELATED APPLICATIONS

This application claims priority to U.S. Provisional Patent Application No. 61/356,592, filed on Jun. 19, 2010, the disclosure of which is incorporated herein by reference in its entirety and is a continuation of U.S. Nonprovisional patent application Ser. No. 13/164,714, filed on Jun. 20, 2011.

FIELD OF THE INVENTION

The present invention relates to vehicle repair. More particularly, the present invention relates to network-based vehicle repair cost estimate acquisition systems and methods.

BACKGROUND OF THE INVENTION

It is readily apparent to an observer of the vehicle repair industry that the traditional way of securing repair cost estimates for minor vehicle damage is outdated, inefficient, timely, and costly. When faced with this type of repair, many consumers struggle with a fundamental choice, i.e., whether to submit an insurance claim for the repair or pay the cost of the repair themselves.

If the consumer decides to submit a claim to the insurance company, traditionally the consumer will have to wait for three different estimates before the repairs actually begin. First, the consumer waits for the insurance company to dispatch an adjuster to estimate the cost of repairs. Generally, the consumer must then blindly decide which shop will complete the repairs. When the consumer does decide on a shop, a second estimate is written by the repair shop. This estimate is often times drastically different from the estimate written by the insurance adjuster. In this case, the shop contacts the insurance adjuster for another inspection of the vehicle. Finally, when an agreed cost to repair is reached between the insurance company and the shop, a third estimate is written and repairs to the consumer's vehicle begin.

Since this traditional method also results in higher operating expenses for the insurance company, ultimately all consumers who own insurance policies are indirectly impacted as these costs are often passed onto the policyholder in the form of increased policy premiums. Even when the consumer decides not to report the minor damage to the insurance company, many vehicle repair shops inflate the estimated cost to repair presumably in order recoup losses in the lower, negotiated repair rates with insurance companies. Consequently, a customer who desires to pay the repair cost himself is often at the mercy of the local repair shop, and securing estimates from several local repair shops usually involves unreasonable outlays of time and effort because the damaged vehicle must be driven to each repair shop so that the vehicle can be inspected prior to the quote. An improved process, addressing these issues, is long overdue.

SUMMARY OF THE INVENTION

Embodiments of the present invention advantageously provide a computer-based method for obtaining repair cost estimates for a vehicle, as well as a related network server.

In one embodiment, the method comprises receiving a vehicle identification number (VIN) over a network from a customer computer, retrieving vehicle information, associated with the VIN, from a database, sending the vehicle information and a graphical representation of the vehicle, including a plurality of selectable vehicle damage locations, over the network to the customer computer, receiving a selection of at least one vehicle damage location over the network from the customer computer, receiving at least one image of the vehicle over the network from the customer computer, storing the vehicle information, the selected damage location and the vehicle image as a repair job in a non-volatile memory or the database, and sending a notification, indicating that the new repair job is available for review, over the network to at least one repair provider computer.

In another embodiment, a network server comprises a processor coupled to a network and a database, and a memory, coupled to the processor, storing instructions adapted to be executed by the processor to perform a method for estimating repair costs for a vehicle as outlined above.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 6, 7 and 8 illustrate partial screen shots of a graphical user interface associated with at least a portion of the method depicted in FIG. 4, in accordance with a web-based embodiment of the invention.

FIGS. 9 and 10 illustrate partial screen shots of a graphical user interface associated with at least a portion of the method depicted in FIG. 5, in accordance with a web-based embodiment of the invention.

DETAILED DESCRIPTION

Figure 1:
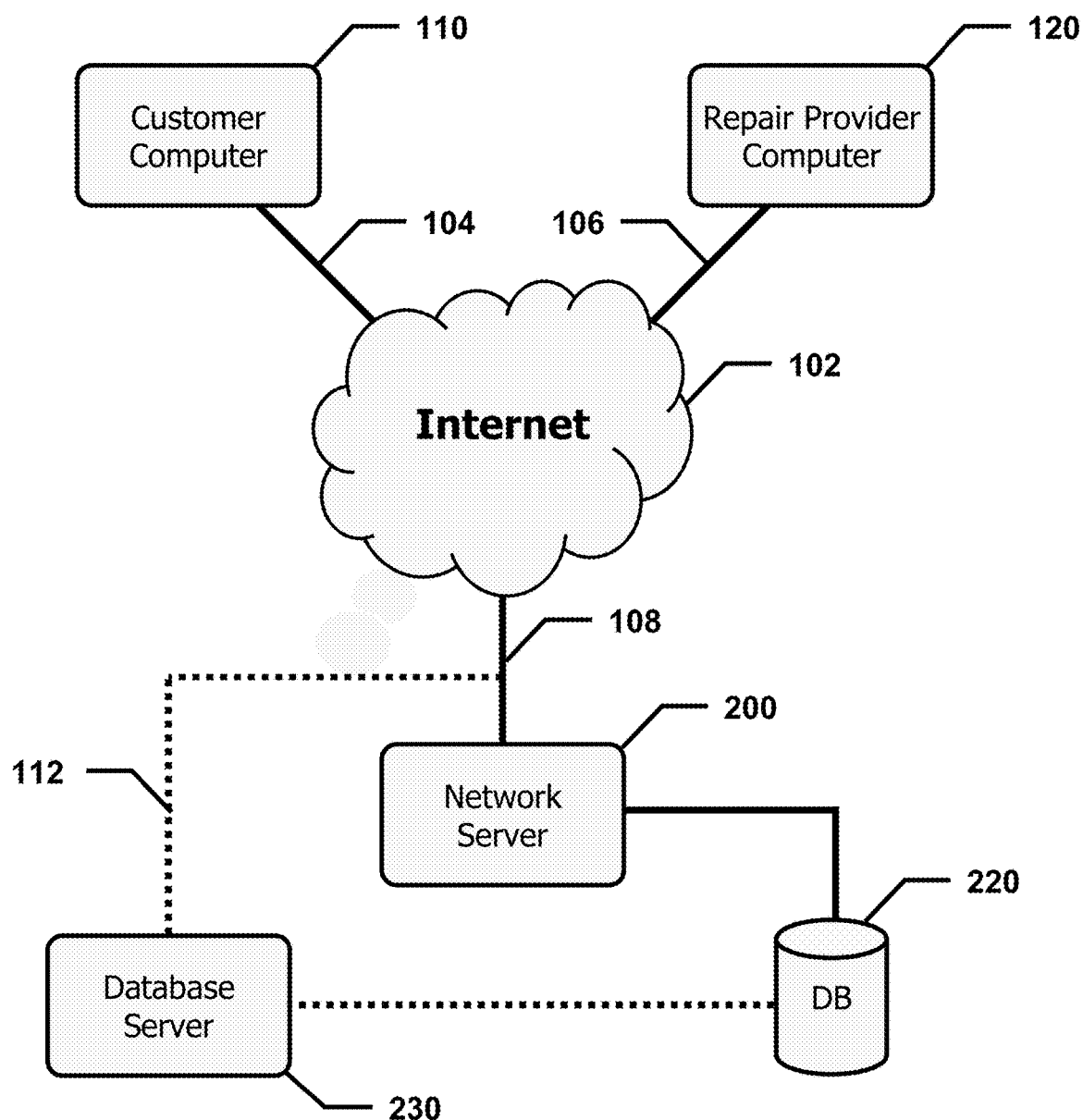
FIG. 1 depicts a block diagram of a network-based vehicle repair cost estimate acquisition system, in accordance with an embodiment of the invention.

The invention will now be described with reference to the drawing figures, in which like reference numerals refer to like parts throughout.

Embodiments of the present invention advantageously provide the customer and the insurance company with a computer-based method for obtaining repair cost estimates. By incorporating this new technology, consumers and insurance companies are able to receive and review repair cost estimates from an unlimited number of shops prior to deciding who will complete the repair. The present invention advantageously overcomes the problems associated with the traditional method of obtaining repair cost estimates as it increases efficiency, reduces costs, and improves repair cycle time. Also, the general population as a whole benefits from the present invention as it allows for a significant reduction in drive time resulting in less pollution and dependency on our already strained system of transportation.

The inventive systems and methods described herein advantageously allow consumers to obtain competitive estimate quotes and quality repairs without driving from shop to shop or searching website after website for the "right" vehicle repair shop. If an insurance claim is contemplated, consumers do not need to wait for their insurance company representatives to inspect, negotiate and decide what, when and how the repairs will be undertaken using the inventive systems and methods described herein.

Additionally, smaller vehicle repair shops, who may not be able to afford advertising and marketing costs but still provide reputable vehicle service and repairs, are able to effectively compete with industry leaders, expand their customer base, and improve profits without incurring massive advertising and marketing fees. In other words, these smaller vehicle repair providers are no longer penalized simply for being small. On the other hand, vehicle insurance professionals can grow their businesses independently, rather than consolidating, using the inventive systems and methods described herein.

It is noted that online marketplaces for physical goods and services have generally enabled consumers to compare prices and make such purchases more efficiently and often times less costly. However, none of the known online marketplaces embody the many advantageous features of the present invention.

While there is no limitation with respect to who can use the present invention, it should be realized that the inventive systems and methods described herein will be of most beneficial to vehicle owners and auto insurance professionals, such as, for example, vehicle repair and/or body shops, insurance adjusters, attorneys, salvage yards, rental car agencies, etc. As noted above, the customer may be a vehicle owner who does not want to submit a claim to an insurance company, and, instead, wishes to directly manage the repairs, or, alternatively, a customer who only wishes to perform partial repairs to the vehicle. For purposes of the present invention, the term "vehicle repair" is also intended to include all aspects of vehicle repairs resulting from a vehicle accident, loss, collision, vandalism, natural disaster, etc.

FIG. 1 depicts a block diagram of a network-based vehicle repair cost estimate acquisition system 100, in accordance with an embodiment of the invention. Customer computer 110, repair provider computer 120 and network server 200 are connected to network 102 through various network connections 104, 106 and 108, respectively. In a preferred embodiment, network 102 is the Internet, however, in other embodiments, network 102 may be a wide area network (WAN), a local area network (LAN), a cellular network, a wireless (WiFi) network, etc., or any combinations of networks. Generally, network connections 104, 106 and 108 may be any of these networks or combinations thereof; other connection mechanisms are also contemplated, such as, for example, dial-up, ADSL, cable modems, PPP, fiber, etc. Regardless of the type of network or method of connection, customer computer 110 and repair provider computer 120 are coupled to network server 200 via one or more networks or network connections in order to exchange data, as is well known in the art. In several embodiments, customer computer 110 and repair provider computer 120 can also exchange data over network 102.

Customer computer 110 and repair provider computer 120 are preferably personal desktop or laptop computers (PCs), or, more generally, network-capable computers or digital devices, such as, for example, personal digital assistants, smart phones, tablet computers, etc.

Figure 2:
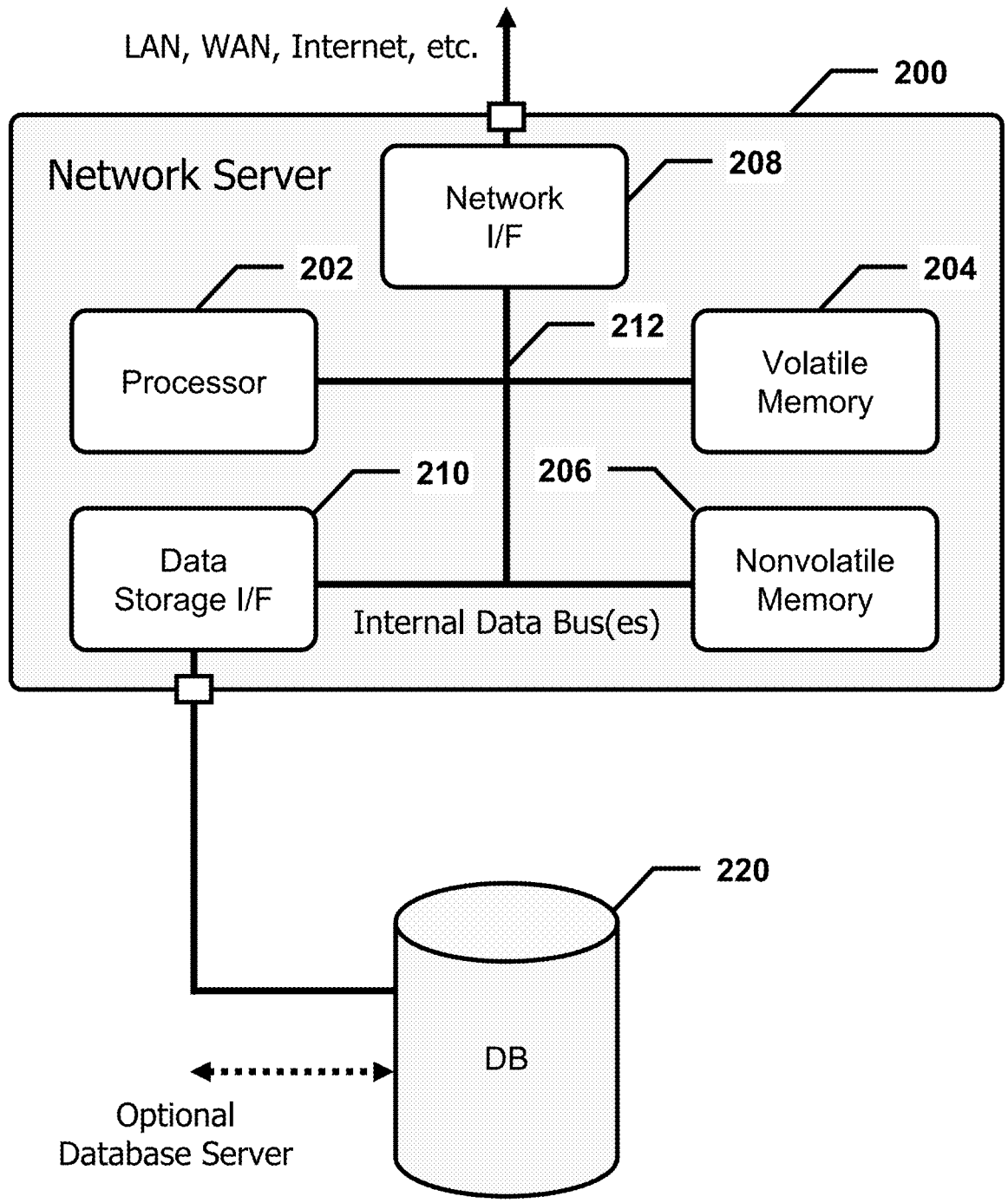
FIG. 2 depicts a block diagram of a vehicle repair cost estimate acquisition network server, in accordance with an embodiment of the invention.

FIG. 2 depicts a block diagram of a vehicle repair cost estimate acquisition network server 200, in accordance with an embodiment of the invention. Network server 200 includes, inter alia, a processor 202 coupled to volatile memory 204, nonvolatile memory 206, a network interface 208, an external data storage interface 210, etc., by one or more internal data buses 212. Other components may also be provided. Database 220, generally representing one or more databases, data structures, file storage systems, etc., is stored on one or more hard disks, RAID arrays, disk farms, etc., internal or external to network server 200. Alternatively, database 220 may be hosted by a separate network database server 230, e.g., a database management system (DBMS), etc., coupled to network 102 and/or network connection 108 via network connection 112, as illustrated in FIG. 1.

Figure 3:
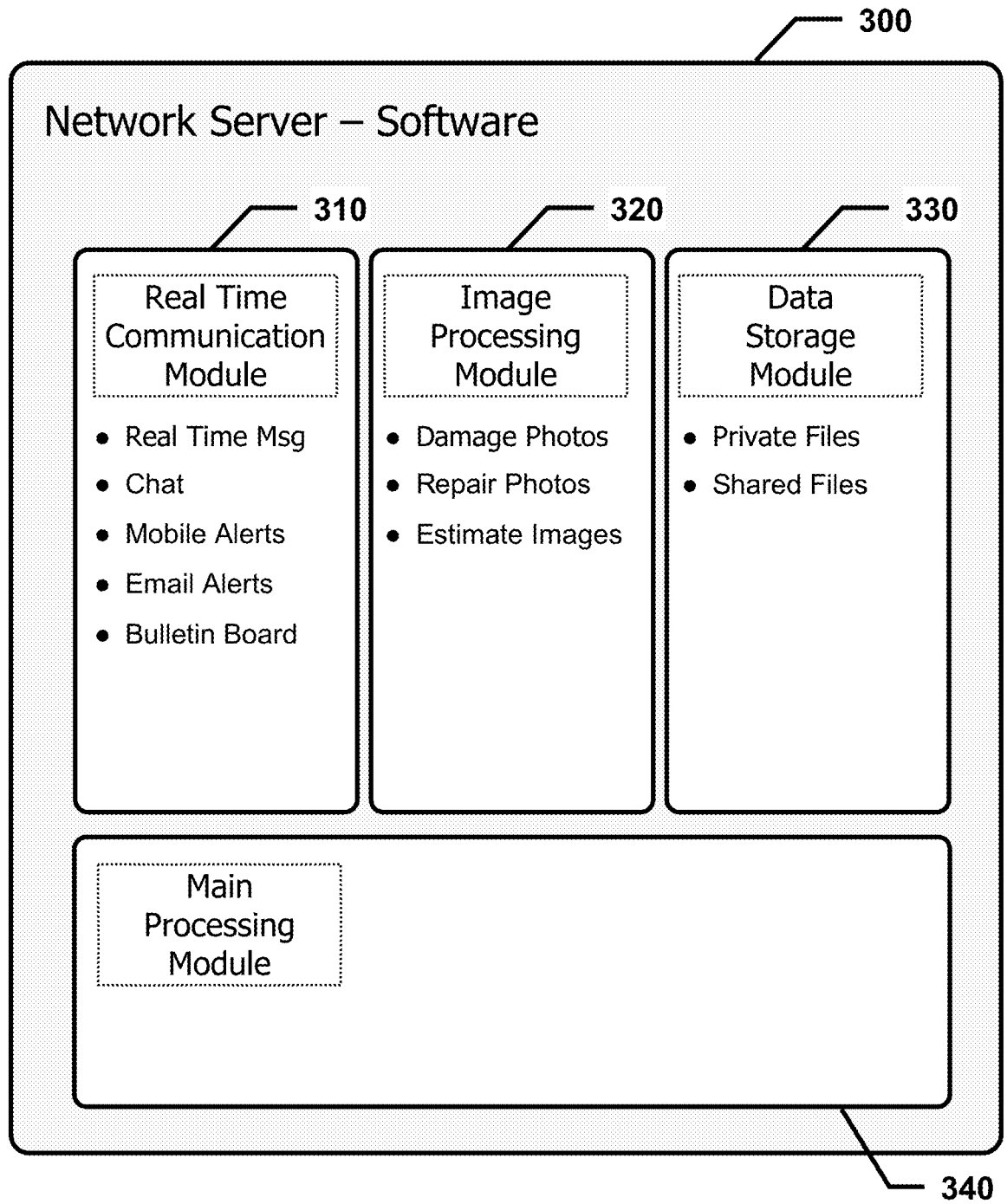
FIG. 3 depicts a representation of the software executed by a vehicle repair cost estimate acquisition network server, in accordance with embodiments of the invention.

FIG. 3 depicts a representation of the network server software 300 executed by the network server 200, in accordance with embodiments of the invention. Network server software 300 may include, inter aka, a real time communication module 310, which provides various communications functionalities, such as real time messaging, chat, mobile alerts, email alerts, bulletin board access, etc., an image processing module 320, which manipulates damage photos, repair photos, estimate images, etc., a data storage module 330, which manages database access, private files, shared files, etc., and a main processing module 340, which may include web page hosting software, enterprise software, server software, etc., as well as implementations of the inventive methods described herein. This description is not intended to be exhaustive or all-inclusive, and other software modules, components, etc. may be, and are, included within network server software 300, as known in the art.

In a preferred embodiment, network-based vehicle repair cost estimate acquisition system 100 is world-wide-web (www) based, and network server 200 is a web server delivering HTML, XML, etc., web pages to customer computer 110 and repair provider computer 120. In other embodiments, a traditional client-server architecture may be implemented, in which network server 200 executes enterprise and custom software, exchanging data with custom client applications running on customer computer 110 and repair provider computer 120.

Figure 4:
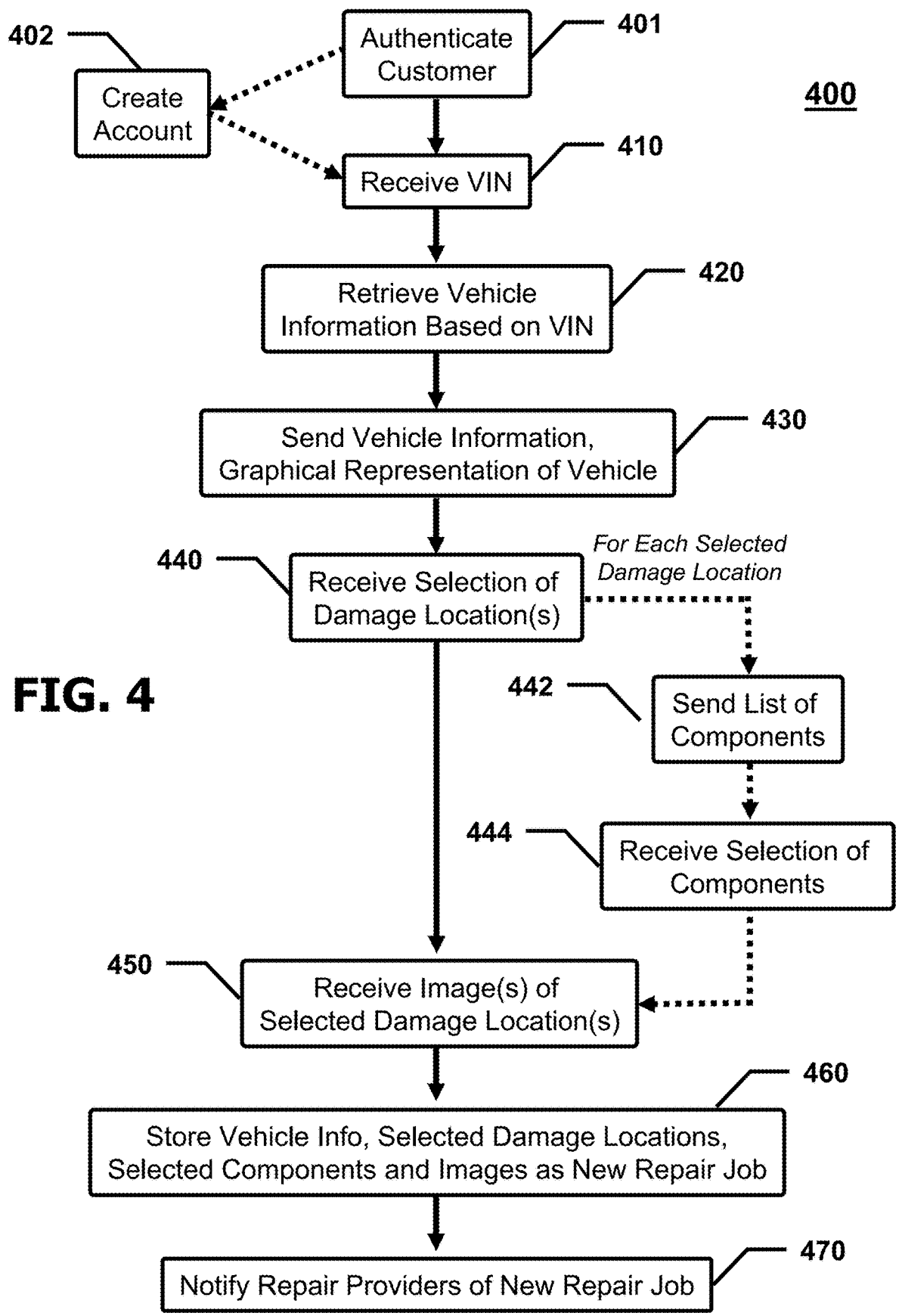
FIG. 4 presents a flow chart of a computer-based method for obtaining vehicle repair cost estimates for a vehicle, in accordance with an embodiment of the invention.

FIG. 4 presents a flow chart of a computer-based method 400 for obtaining repair cost estimates for a vehicle, in accordance with an embodiment of the invention. This method executes on network server 200, and, in a preferred embodiment, network server 200 primarily interacts with customer computer 110 and repair provider computer 120 via web pages delivered to web browsers executing on each computer. Additional communication methods are also contemplated, including, for example, text messages over one or more cellular networks, email messages over network 102, etc. In a preferred embodiment, the customer launches a web browser on customer computer 110 and enters the network address (e.g., URL) for network server 200 in the address line; in response, network server 200 provides an initial web page over network 102 for display on customer computer 110.

Figure 6:
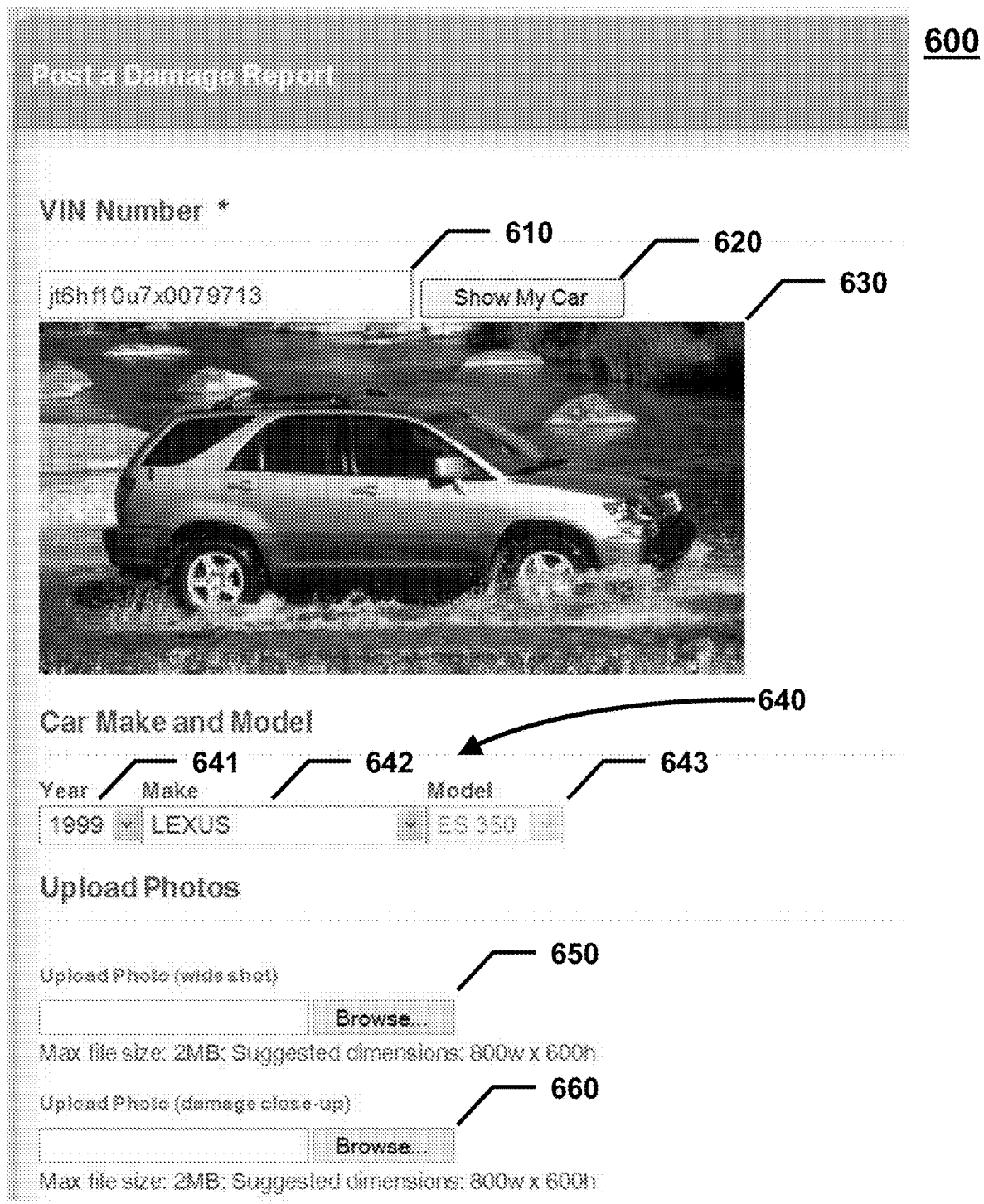
Figure 7:
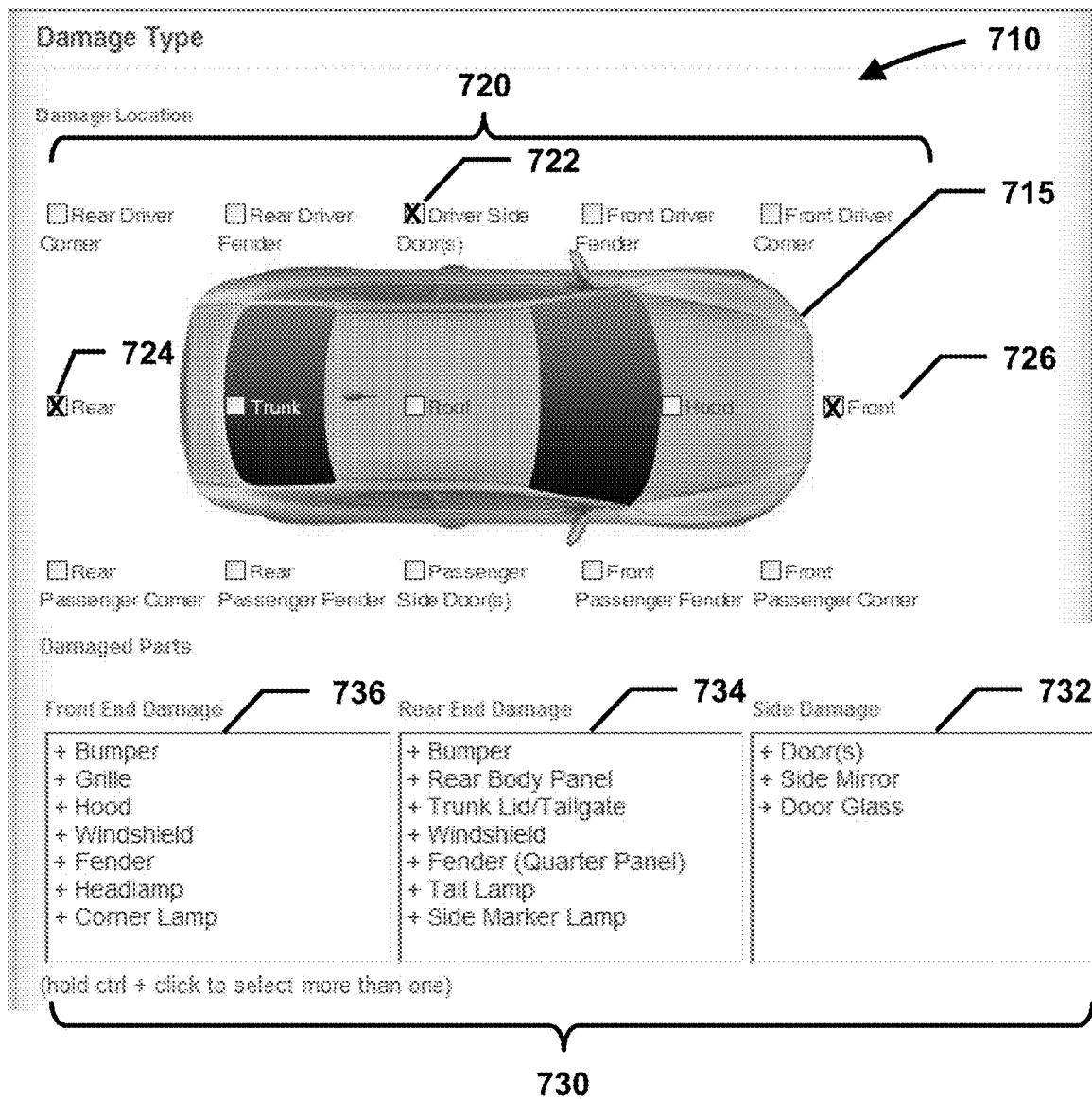
Figure 8:
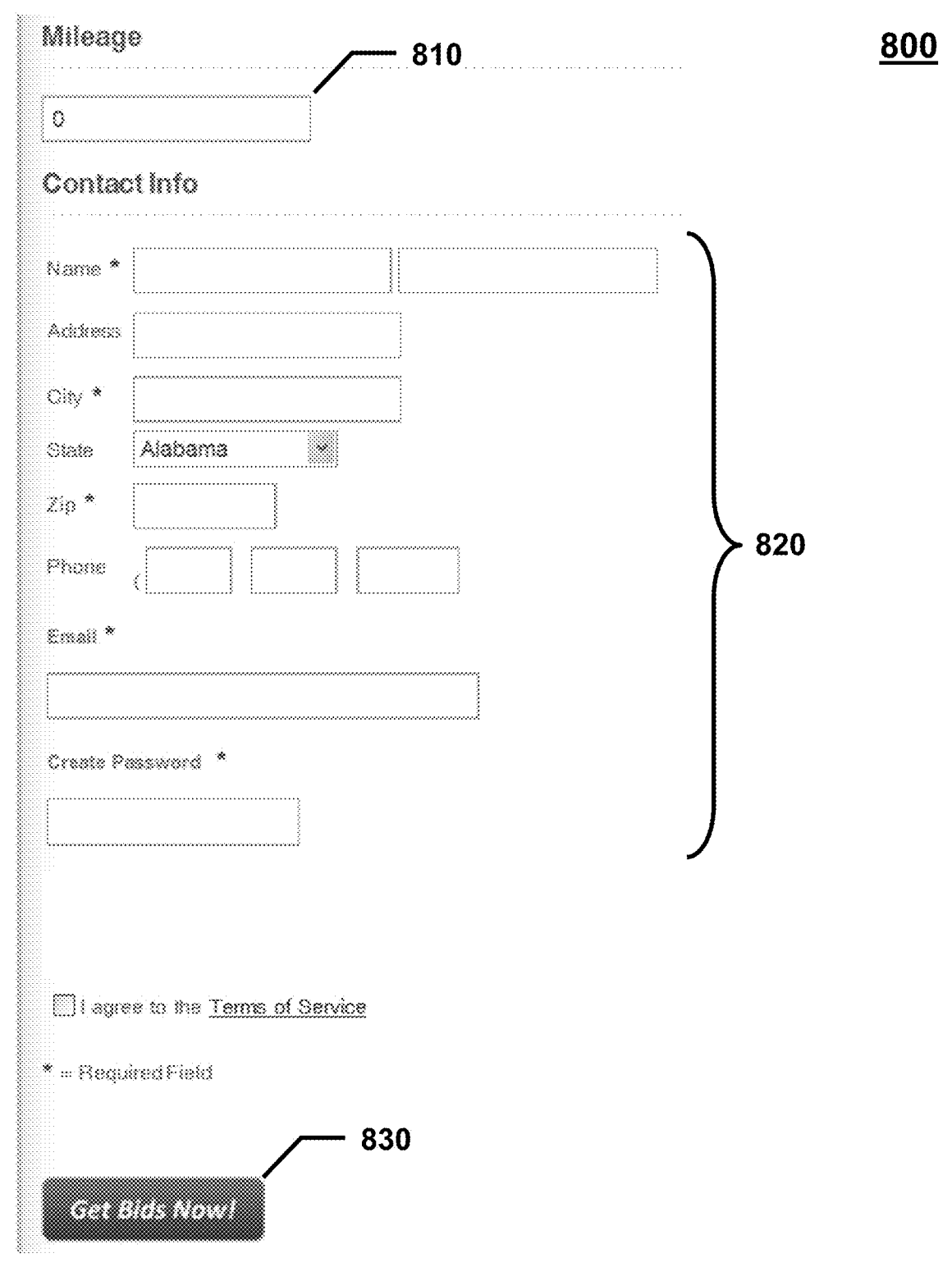

FIGS. 6, 7 and 8 illustrate partial screen shots 600, 700, 800 of a graphical user interface associated with at least a portion of the method depicted in FIG. 4, in accordance with a web-based embodiment of the invention, and will be referred to during the description of the method.

In one embodiment, network server 200 first authenticates (401) customer computer 110 by requesting a username/password combination, which may be created (402) beforehand or contemporaneously, as is well known in the art. After authentication, the initial web page described above is sent over network 102 for display on customer computer 110, which includes, inter alia, an input field 610 for the vehicle identification number (VIN). The customer enters the VIN in input field 610 and selects a send or submit button 620, labeled as "Show My Car" in FIG. 6. Network server 200 then receives (410) the VIN over network 102 from customer computer 110.

In response to receiving the VIN, network server 200 retrieves (420) vehicle information, associated with the VIN, from database 220, which may be directly connected to network server 200 using data storage interface 210, connected to network server 200 over a local area network or indirectly connected to network server 200 by an optional database server 230 over network connection 112. The vehicle information includes the year, make and model of the vehicle, as well as other, optional information, such as, for example, a digital image of the vehicle.

Network server 200 then creates a graphical representation of the vehicle 710 that includes including a plurality of selectable vehicle damage locations. In a preferred embodiment, the graphical representation of the vehicle 710 includes an overhead image of the vehicle 715 and a plurality of selectable icons 720 surrounding, and/or superimposed on, the image 715. The vehicle information and the graphical representation of the vehicle 710 are sent (430) over network 102 to customer computer 110 for display. In one embodiment, the customer may modify the year, make or model of the vehicle information 640 via pull down menus 641, 642, 643. In another embodiment, a digital image of the vehicle 630 is also sent and displayed with the vehicle information 640.

Generally, the customer now selects at least one of the possible vehicle locations that may be damaged, and provides at least one digital image of the damaged locations. For example, the customer selects at least one icon 720, and, in the illustrated embodiment, identifies one or two digital images 650, 660, e.g., a wide shot and/or a close up shot, respectively, that are stored on customer computer 110. The selected damage locations and digital images are sent to network server 200 when the send or submit button 830 is selected, labeled as "Get Bids Now!" in FIG. 8. In this embodiment, network server 200 receives (440) the selection of damage locations and receives (450) the digital images of the vehicle at the same time, along with other, optional information provided by the customer, such as, for example, the mileage 810 of the vehicle, customer contact info 820, etc.

In a preferred embodiment, each selection of an icon 720 is immediately transmitted from customer computer 110, over network 102, and received (440) by network server 200, which then retrieves a list of components associated with the selected damage location from nonvolatile memory 206 or database 220. Network server 200 then sends (442) the list of components over network 102 to customer computer 110, which is displayed to the customer. As depicted in FIG. 7, for example, the driver side door 722, rear 724 and front 726 have been selected, and the respective component lists 730, including side components 732, rear components 734 and front components 736, have been retrieved, transmitted and displayed to the customer, who then selects one or more components from each list. The component selections and digital images are sent to network server 200 when the send or submit button 830 is selected, labeled as "Get Bids Now!" in FIG. 8. In this embodiment, network server 200 receives (444) the selection of components and receives (450) the digital images of the vehicle at the same time, along with other, optional information provided by the customer, such as, for example, the mileage 810 of the vehicle, customer contact info 820, etc.

Network server 200 then stores (460) the vehicle information, the selected damage locations (and components, if any), and the digital images of the vehicle as a new repair job in a non-volatile memory 206 or database 220.

Finally, network server 200 sends (470) a notification, indicating that the new repair job is available for review, over network 102 to the repair provider computer 120. The notification can be an email message, a pop-up browser window or alert message on the repair provider computer 120, a text message to the repair provider's cell phone or smart phone, etc.

Figure 5:
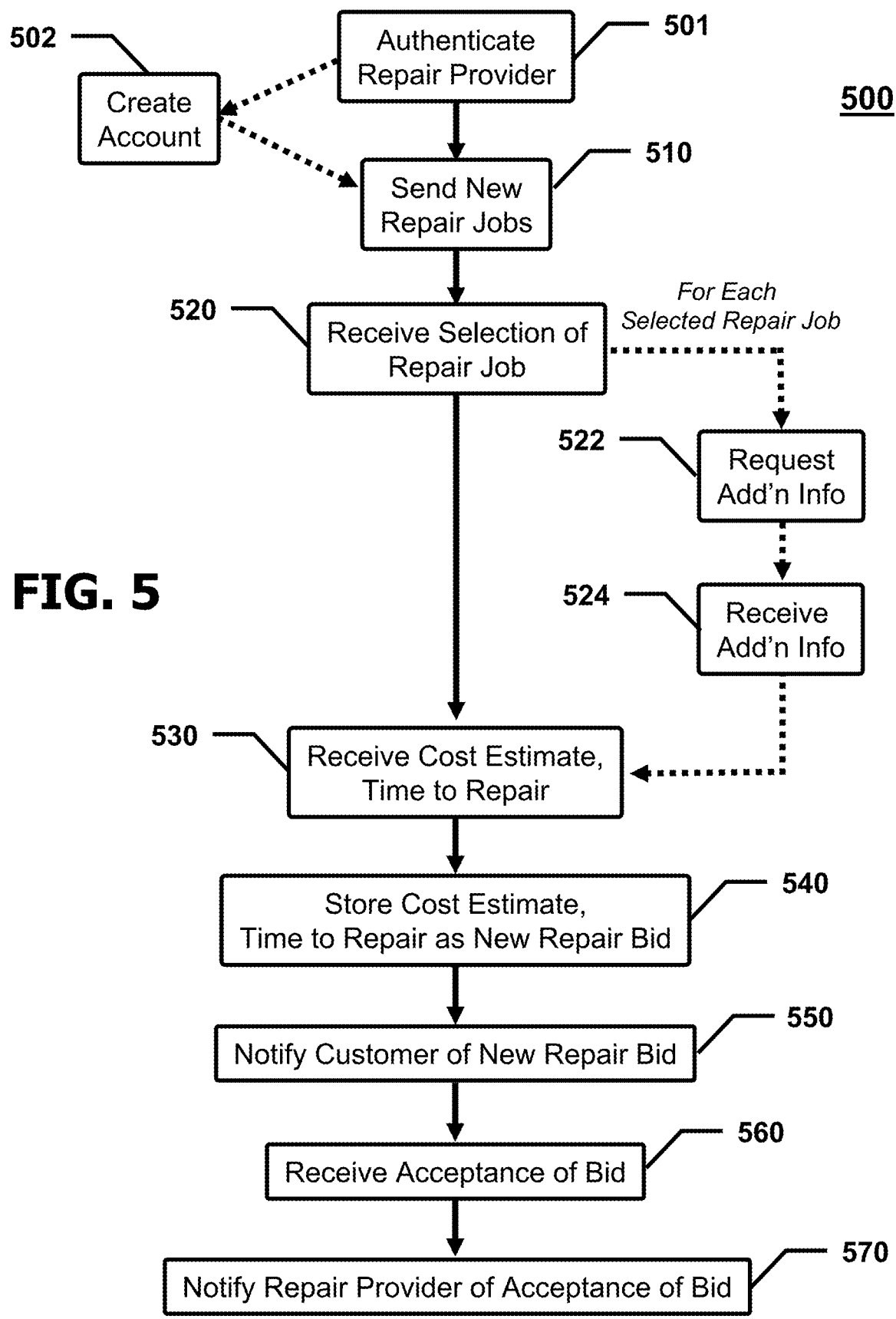
FIG. 5 presents a supplemental flow chart for the method depicted in FIG. 4, in accordance with an embodiment of the invention.

FIG. 5 presents a supplemental flow chart for the method depicted in FIG. 4, in accordance with an embodiment of the invention. In a preferred embodiment, the repair provider launches a web browser on repair provider computer 120 and enters the network address (e.g., URL) for network server 200 in the address line; in response, network server 200 provides an initial web page over network 102 for display on repair provider computer 120.

Figure 9:

FIGS. 9 and 10 illustrate partial screen shots 900, 1000 of a graphical user interface associated with at least a portion of the method depicted in FIG. 5, in accordance with a web-based embodiment of the invention, and will be referred to during the description of the method.

In one embodiment, network server 200 first authenticates (501) repair provider computer 120 by requesting a username/password combination, which may be created (502) beforehand, as is well known in the art. After authentication, the initial web page described above is sent (510) over network 102 for display on repair provider computer 120, which includes, inter aka, at least one repair job 910. FIG. 9 depicts three (3) repair jobs, each one including relevant information, such as, for example, a digital image 912 of the vehicle damage location, vehicle information 914, a description, a location, an urgency, etc., as well as one or more selectable icons including a prepare bid 916 icon and a send message 918 icon.

Generally, the repair provider now selects one of the repair jobs, and provides a bid amount 1010, estimated time to complete 1020, and optional questions/comments 1020. The bid is sent to network server 200 when the send or submit button 1040 is selected, labeled as "Send!" in FIG. 10. In this embodiment, network server 200 receives (520) the repair job selection and receives (530) the bid amount 1010 and estimated time to complete 1020 at the same time, along with optional questions/comments 1030.

In an alternative embodiment, the repair provider can request additional information by selecting the send message 918 icon. Network server 200 then receives the request for additional information over network 102 from repair provider computer 120, and sends (522) the request for additional information over network 102 to customer computer 110. After the additional information is received (524) from customer computer 110, network server 200 sends the additional information to repair provider computer 120. The bid amount 1010, estimated time to complete 1020, and optional questions/comments 1020 are sent (530) to network server 200 when the send or submit button 1040 is selected, labeled as "Send!" in FIG. 10.

Network server 200 then stores (540) the bid amount 1010 and estimated time to complete 1020 as a new repair bid in a non-volatile memory 206 or database 220.

Network server 200 then sends (550) a notification, indicating that the new repair bid is available for review, over network 102 to the customer computer 110. The notification can be an email message, a pop-up browser window or alert message on the repair provider computer 120, a text message sent to the customer's cell phone or smart phone, etc.

The customer then accepts (560) the repair bid, using the customer computer 110 or a digital device, and, finally, network server 200 sends (570) a notification, indicating that the repair bid has been accepted, over network 102 to the repair provider computer 120.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A communication apparatus, comprising:
a network server, the network server comprising non-transitory memory and a processor connected to the non-transitory memory, the network server being communicatively connectable to a plurality of computing devices via at least one network; and
the non-transitory memory having instructions stored thereon that cause the network server to perform operations upon execution of the instructions by the processor such that the network server is configured to:
retrieve from a first database, vehicle information comprising a specific year, a make and a model of a respective vehicle corresponding to a damaged vehicle to yield retrieved vehicle information, wherein the first database stores vehicle information for a plurality of vehicles, the vehicle information for each of the plurality of vehicles comprising a VIN associated with the specific year, the make, and the model of each respective vehicle; and
send, to a first computing device, a vehicle image for display in a user interface of the first computing device; and
in response to receiving a damage image of an actually damaged location of the damaged vehicle and a user input associating the damage image to a selected portion of the vehicle image:
create a new repair job record for estimation of a repair of the damaged vehicle, the created new repair job record associating the retrieved vehicle information, the damage image, and the user input associating the at least one damage image to the selected portion of the vehicle image;
send a communication identifying the created new repair job record to a second computing device located at a site remote from the network server and the first computing device, wherein the created new repair job record is accessible by the second computing device, and wherein the communication is sent to the second computing device prior to the damaged vehicle being present for physical inspection at a repair facility associated with the second computing device; and
store data received from the second computer device in the new repair job record, the data comprising an estimated cost for repairing the damaged vehicle and an estimated total time to complete the repair that is based on the created new repair job record prior to the damaged vehicle being present for physical inspection at the site.

2. The apparatus of claim 1, wherein the first computing device is not pre-loaded with images of the plurality of vehicles and associated vehicle components.

3. The apparatus of claim 2, wherein the second computing device is a personal desktop computer or a personal laptop computer.

4. The apparatus of claim 3, wherein the first computing device is a smart phone.

5. A communication system comprising:
a network server communicatively connectable to a first computing device and a second computing device, the network server comprising non-transitory memory and a processor connected to the non-transitory memory, the network server being communicatively connectable to a plurality of computing devices via at least one network; and
the non-transitory memory having instructions stored thereon that cause the network server to perform operations upon execution of the instructions by the processor such that the network server is configured to:
retrieve from a first database, vehicle information comprising a specific year, a make and a model of a respective vehicle corresponding to a damaged vehicle to yield retrieved vehicle information, wherein the first database stores vehicle information for a plurality of vehicles, the vehicle information for each of the plurality of vehicles comprising a VIN associated with the specific year, the make, and the model of each respective vehicle; and
send, to the first computing device, a vehicle image for display in a user interface via the first computing device; and
in response to receiving a damage image of an actually damaged location of the damaged vehicle and the user input indicating at least one damage location corresponding to a portion of the vehicle image:

create a new repair job record for estimation of a repair of the damaged vehicle, the created new repair job record associating the retrieved vehicle information and the user input indicating the at least one damage location corresponding to the portion of the vehicle image with the damage image;

send a communication identifying the created new repair job record to the second computing device located at a site remote from the network server and the first computing device, wherein the created new repair job record is accessible by the second computing device, and wherein the communication identifies the created new repair job record to the second computing device prior to the damaged vehicle being present for physical inspection; and store data received from the second computer device in the new repair job record, the data comprising an estimated cost for repairing the damaged vehicle and an estimated total time to complete the repair that is based on the created new repair job record prior to the damaged vehicle being present for physical inspection at the site.

6. The communication system of claim 5, including the first computing device and the second computing device, the first computing device being a smart phone and the second computing device being a desktop personal computer or a laptop personal computer.

7. A communication method comprising:
in response to receiving, by the network server comprising a processor, a vehicle identification number (VIN) for a damaged vehicle:
retrieving, from a first service of stored vehicle information for a plurality of vehicles, damaged vehicle information for the damaged vehicle, the damaged vehicle information comprising a damaged vehicle specific year, a damaged vehicle make and a damaged vehicle model to yield the retrieved damaged vehicle information, wherein the first service associates a VIN with a specific year, a make, and a model for each respective vehicle of the plurality of vehicles, and sending, to a first computing device, a vehicle image for display in a user interface of the first computing device;

in response to receiving a damage image of a damaged location of the damaged vehicle and a user input associating the damage image to a selected portion of the vehicle image: creating, by the network server, a new repair job record for estimation of a repair of the damaged vehicle, to yield the created new repair job record, the created new repair job record associating the retrieved damaged vehicle information and the user input associating the at the damage image to the selected portion the vehicle image, and configured to later add additional data comprising an estimate of a cost of repairing the damaged vehicle and an estimated total time to complete the repair by a repair shop; and sending a communication relating to the created new repair job record to a second computing device located at a site remote from the network server and the first computing device, wherein the communication conveys the new repair job record to the second computing device prior to the damaged vehicle being present for physical inspection at a repair facility associated with the second computing device; and receiving, by the network server, the additional data comprising the estimate of the cost of repairing the damaged vehicle and the estimated total time to complete the repair by the repair shop, and storing, by the network server, the additional data in the created new repair job record.

8. The method of claim 7, further comprising:
the network server receiving from the first computing device the user input associating the at least one damage location to the portion of the vehicle image.

9. The method of claim 8, wherein the first computing device is not pre-loaded with images of the plurality of vehicles and associated vehicle components.

10. The method of claim 7, comprising:
adding the additional data comprising the estimate of the cost of repairing the damaged vehicle and the estimated total time to complete the repair by a repair shop; in response to receipt of the additional data from the second computing device.

11. The method of claim 7, comprising:
the first computing device sending the vehicle identification number (VIN) for the damaged vehicle to the network server.

12. The method of claim 11, comprising:
the first computing device generating the user interface on a display of the first computing device.

13. The method of claim 11, wherein the first computing device communicates with the network server via at least one communication network.

14. The method of claim 11, comprising:
the second computing device sending the additional data to the network server.

15. The method of claim 14, wherein the second computing device communicates with the network server via at least one communication network.

16. The method of claim 14, wherein the site remote from the network server and the first computing device is a site of a repair shop.

* * * * *